United States Patent [19]
Besenfelder et al.

[11] 4,044,329
[45] Aug. 23, 1977

[54] VARIABLE CYCLIC REDUNDANCY CHARACTER DETECTOR

[75] Inventors: Edward R. Besenfelder; Jack L. Gooding, both of Phoenix, Ariz.

[73] Assignee: Honeywell Information Systems, Inc., Phoenix, Ariz.

[21] Appl. No.: 702,158

[22] Filed: July 2, 1976

[51] Int. Cl.² .............................................. G06K 5/04
[52] U.S. Cl. ................................. 340/146.1 F; 360/26
[58] Field of Search .............. 340/146.1 F, 146.1 AG, 340/146.1 AL; 360/26, 45, 50, 53

[56] References Cited

U.S. PATENT DOCUMENTS

| | | | |
|---|---|---|---|
| 3,519,988 | 7/1970 | Grossman | 340/146.1 F |
| 3,670,304 | 6/1972 | Andresen et al. | 340/146.1 F |
| 3,708,783 | 1/1973 | Hedin | 340/146.1 F |
| 3,725,861 | 4/1973 | Hancock | 340/146.1 F |
| 3,774,154 | 11/1973 | Devore et al. | 340/146.1 F |
| 3,789,400 | 1/1974 | Towns | 360/26 |
| 3,792,436 | 2/1974 | De Voy et al. | 340/146.1 F |
| 3,812,531 | 5/1974 | Hall | 360/26 |
| 3,882,459 | 5/1975 | Barlow et al. | 340/146.1 F |

*Primary Examiner*—Charles E. Atkinson
*Attorney, Agent, or Firm*—J. Stanley Edwards; William W. Holloway, Jr.; Ronald T. Reiling

[57] ABSTRACT

The invention disclosed reduces unrecoverable read errors from a magnetic tape resulting from the apparent lack of a cyclic check character (CCC), sometimes referred to as a cyclic redundancy check character, or a longitudinal check character (LCC), sometimes referred to as a longitudinal redundancy check character. The detector provides a variable read window to synchronize receipt of the CCC and/or LCC with their associated data blocks even though the CCC and/or LCC was not written in the appropriate time frame called for by the write specification of the tape in question.

6 Claims, 4 Drawing Figures

VARIABLE CYCLIC REDUNDANCY CHARACTER DETECTOR

BACKGROUND OF THE INVENTION

1. Field of the Invention

The invention disclosed is primarily for use with magnetic tape units associated with data processing systems. The variable cyclic redundancy character detector may be used with seven or nine track magnetic tapes with character densities of either 800, 556 or 200 characters per inch (cpi).

2. Description of the Prior Art

Prior art mechanism for detecting the CCC and/or LCC are fixed, non-variable devices that must detect the LCC or CCC at a fixed point in time after data block is read or the data block is deemed to have been read in error. No known mechanisms provide for compacting or extending the time period from the end of the data block to when the CCC or LCC may appear and, consequently, if the CCC, which should appear four character spaces after the end of the data block but had been inadvertently written five character spaces after the data block, the data block would be considered in error.

SUMMARY OF THE INVENTION

In accordance with the instant invention a variable cyclic redundancy check character detector, hereinafter referred to as "the Detector", is presented. The Detector allows for automatically setting the window, i.e., the projected time frame the CCC or LCC byte is to arrive, at the time interval desired. If, for example, a nine track, 800cpi tape is being read and the CCC is supposed to be four character spaces behind the data block, the Detector is initially set to try to read the CCC at any time up to four character spaces behind the data block. If no data is detected, a blank CCC is read into the appropriate registers. Since the CCC may be either even or odd parity or blank, the CCC is presumed valid and the LCC is read and checked for odd parity.

If the proper parity is not obtained by reading a blank CCC into the registers or if the contents of the CCC register does not equal $727_8$, the magnetic tape is reread and the character space counter is reset to move the window further from the data block to detect if the CCC comes in at a later point in time. By repetitively rereading the data block and the subsequent sliding of the window the CCC can be detected and read if it was written at the end of the data block.

When a blank CCC does not result in the subsequent LCC causing odd parity in each track or the contents of the CCC register does not equal $727_8$ and repetitive reading of the data with varying window depths does not detect a CCC within an appropriate number of character spaces, generally no more than six, of the end of the data block, the data is declared invalid and the appropriate fault indications are generated to the control circuitry of the magnetic tape controller.

It is, therefore, an object of this invention to decrease the number of invalid data blocks read from magnetic tape.

It is a further object of this invention to provide a variable detection window for the CCC and/or LCC.

In order to understand the operation of the variable cyclic redundancy character detector it is necessary to understand how the CCC and LCC are generated, as well as their relationship to the rest of the data block. While the instant invention is operable with tape formats that include the CCC and the LCC or just the LCC, the description that follows will assume a CCC character is present.

Figure 1:
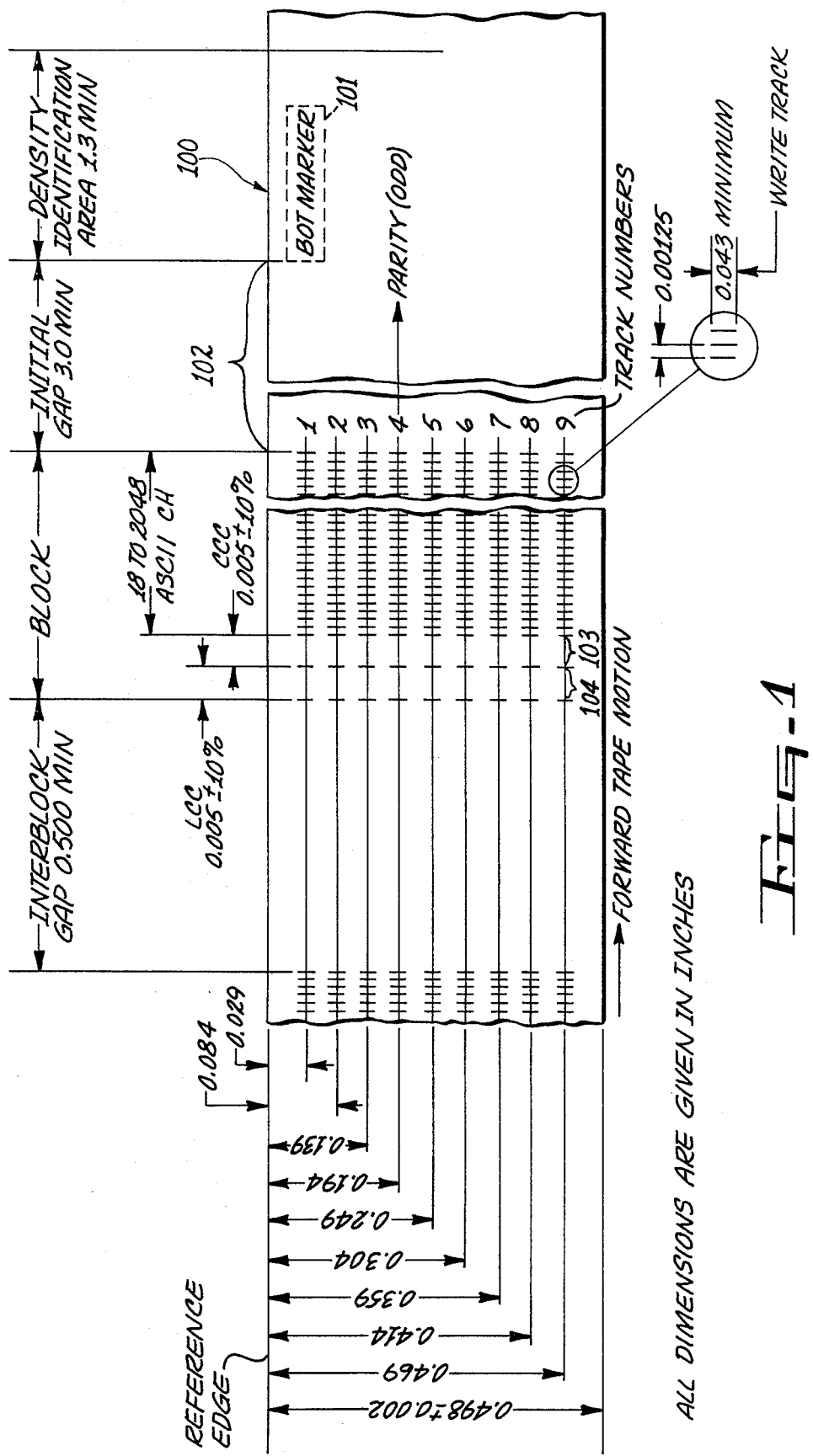
FIG. 1 is an illustration of the recording format for 800cpi NRZI magnetic tape.

FIG. 1 is an illustration of the recording format for 800cpi NRZI tape as set forth in the USA Standard Code for Information Interchange, approved as a USA standard by the United States of America Standards Institute. The BOT marker 101 of FIG. 1 illustrates that portion of the tape 100 which identifies the following data blocks. A predetermined gap 102 after the beginning of tape marker starts the nine tracks of data positioned as illustrated in the drawing. Anywheres from a minimum of 18 to a maximum of 2048 bytes may be present in any one given data block. At a predetermined distance from the end of the data namely four byte spaces 103 the CCC should appear. Four byte spaces later the LCC should appear. Immediately following the LCC and prior to the next data byte an inter-block gap shown in FIG. 1 is required. This sequence is followed throughout the balance of the tape. With this basic understanding of 800cpi, NRZI tape we now move to the heart of the instant invention.

Figure 2:
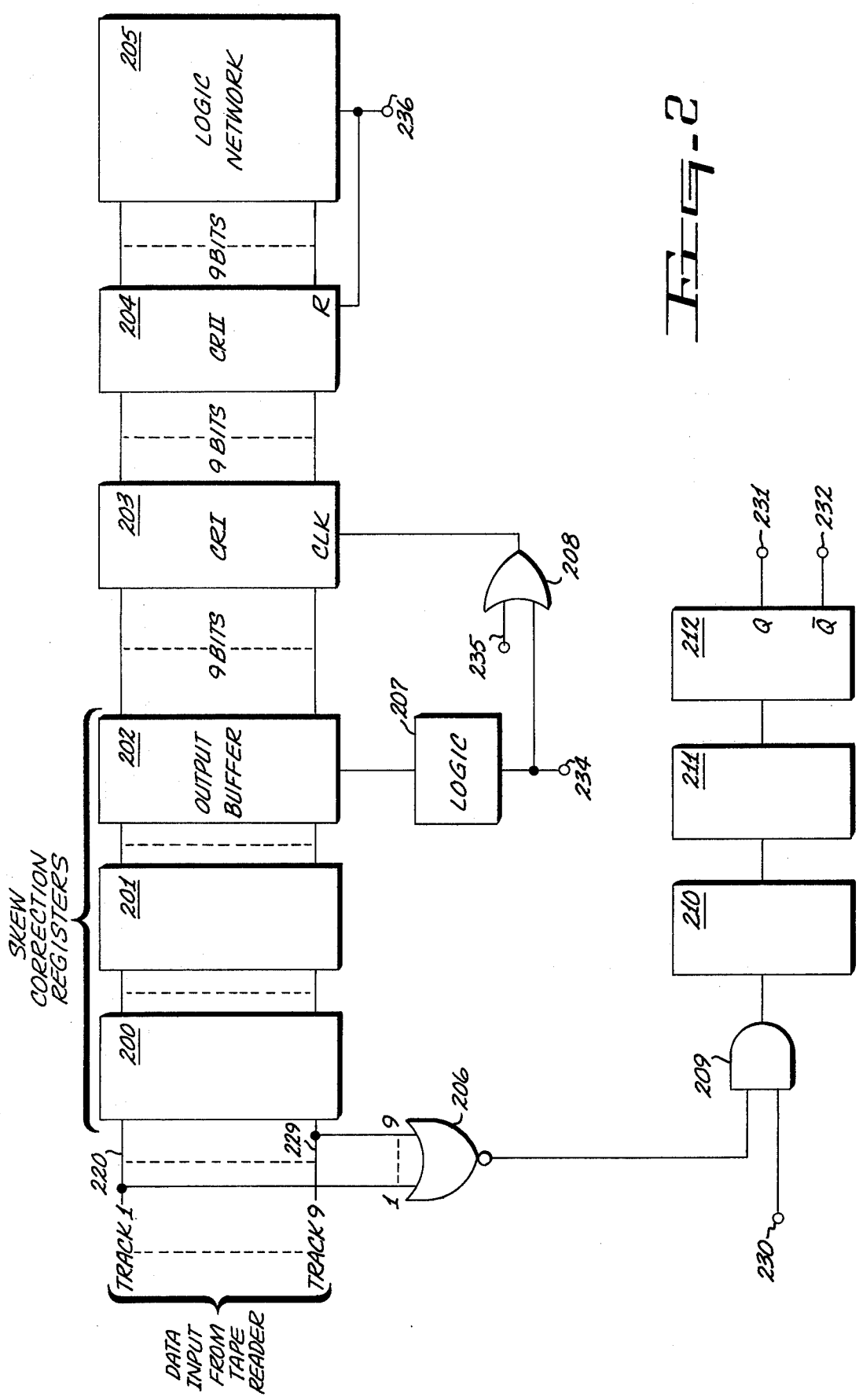
FIG. 2 is a block/schematic diagram of the skew correction and character registers of the instant invention.
Figure 4:
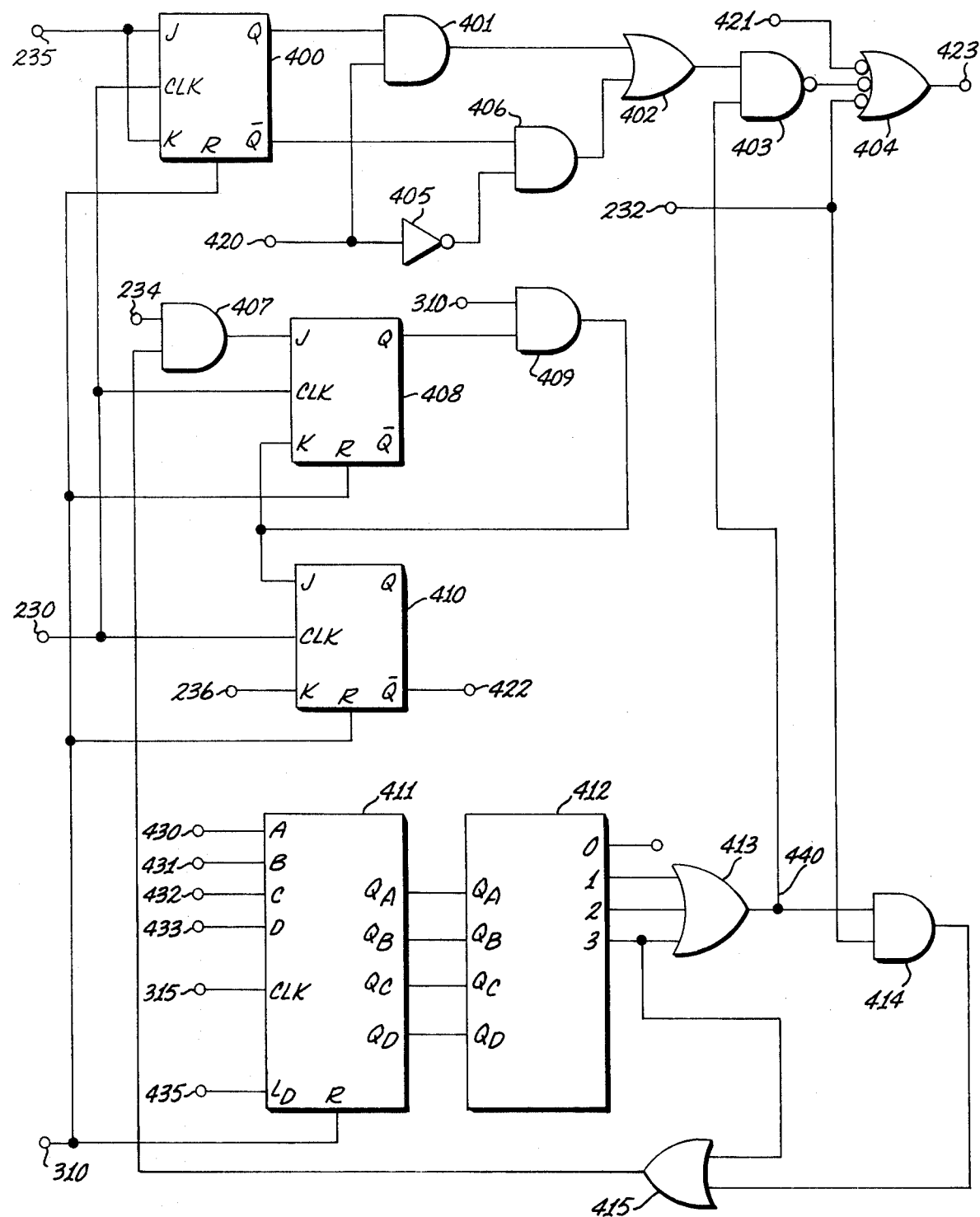
FIG. 4 is a schematic diagram of the window generator and parity prediction circuitry.

A CCC register is included in the logic network 205 shown in FIG. 2. As the data is transferred from Character Register II (CRII) 204 into the logic network 205, a CCC is accumulated from the data. When the written CCC on the tape is read into the logic network 205, it cancels out the accumulated CCC in the register such that if no errors have occurred, the output of the CCC register will be all zeroes after all bits other than those of tracks 5 and 9 are inverted, tracks 5 and 9 corresponding to bit positions 4 and 6 in the CCC register. Both the encoding of the CCC onto the tape and the decoding of the CCC by the logic network involves a complex algorithm upon which the CCC is based. The CCC also serves an additional function. The parity output signal 423 of FIG. 4 represents whether or not an even or odd number of data bytes has been transferred from the output buffer 202 of the skew correction registers 200, 201, and 202 into Character Register I (CRI) 203, the CCC is so constructed that its parity at the byte level must be the same as the output at 423 of FIG. 4, more of which will be explained later.

The LCC on the other hand works in a more straightforward manner. In the logic network of FIG. 2, nine flip-flops are strobed each time CRII 204 is read. The outputs of these flip-flops indicate whether or not an even or odd number of 1's have been read from each one of the nine separate data tracks. The LCC is always odd parity at the byte level in 800cpi NRZI. If it is properly structured, the LCC will always cause these flip-flops to indicate that an even number of 1's have been read on each track. It should also be noted that the CCC character is read into this series of flip-flops and therefore will effect the structuring of the LCC.

The invention can operate using various type magnetic tape codes, such as the 200, 556, or 800cpi, non-return to zero (NRZI) tape standard. Neither the 200 or 556cpi tapes incorporate a CCC in their format and appropriate correction signals must be generated by the magnetic tape unit controller to ensure proper operation utilizing these two tapes.

As the tape is passed under the read heads of a magnetic tape unit, nine separate tracks of data, 220–229 of FIG. 2, are monitored for magnetic flux changes on the tape. In the NRZI mode a flux change occurs only where a one 1 has been written and appropriate decode logic is necessary to transform the data into the conventional 1 and 0 format required by the MTU logics circuits. Once the data has been converted it is then stored in a bank of skew correction registers as indicated in FIG. 2. While the drawing illustrates only three banks of deskew registers, five or more may be used if serious skew problems are apt to be encountered.

Skew itself is defined as the longitudinal variations in positioning of the nine bits of each byte caused by either misalignment of the bits when written onto the tape or by misalignment of the read heads or the tape itself when read. By selective clocking of the skew registers the data bits are properly aligned and when so positioned in the output buffer of the skew correction registers, a transfer clock signal 234 is generated which transfers the data stored in the output buffer 202 into CRI 203 of FIG. 2.

Figure 3:
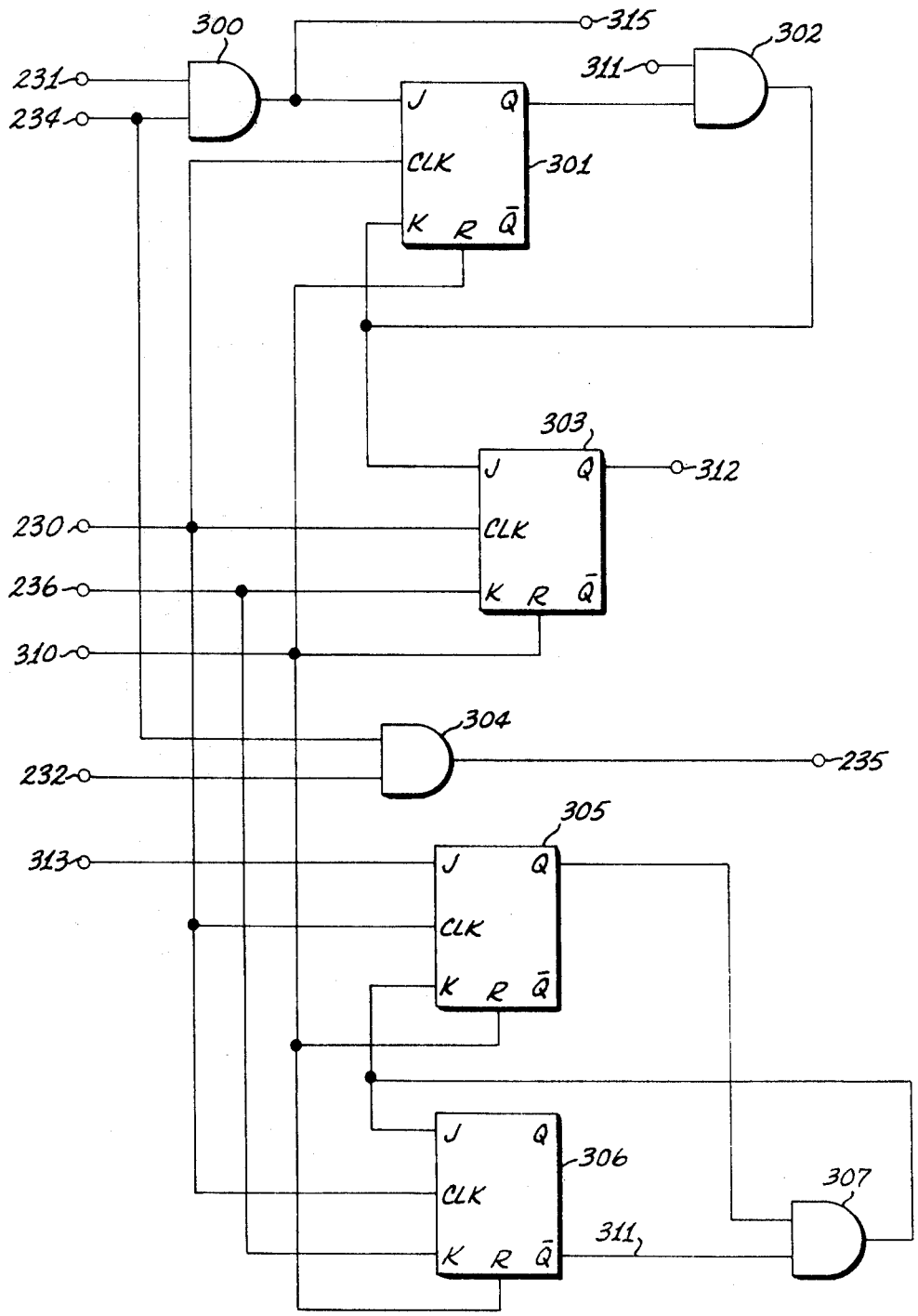
FIG. 3 is a schematic diagram of the logic circuits used to determine the location of the CCC and whether or not it is a blank.

It is this point in the data flow that the Detector comes into play. As shown in FIG. 3, the non-blank transfer clock 235 signal is the AND'ed output of the transfer clock signal 234 and blank detector signal 232. The transfer clock signal is generated whenever the output buffer of the skew correction registers is full and ready for transfer into CRI. Concurrently with transfer of the data, the transfer clock also clears the output buffer. As indicated in FIG. 2, blank detector signal 231 is generated only when the output buffer 202 of the deskew registers contain all blanks and data clock 230 is present. Registers 210–213 align signal 231 with the data block with which it is associated. Non-blank transfer signal 235 is generated only when the data in the output register is ready to be transferred and that data does not consist of an all zero byte, it is then used as the J and K inputs to flip-flop 400 of FIG. 4. Flip-flop 400 is toggled by data clock 230, a 10 megacycle clock that is operative whenever the system is powered on and to which all other signals are synchronized.

The Q output of flip-flop 400 is high whenever an odd number of bytes have been transferred from output buffer 202 into CRI. This signal is AND'ed at gate 401 with signal 420. Signal 420 represents that the tape being read is a nine track 800cpi, NRZI tape when in the high state. Consequently, the output of gate 401 represents what the parity of the CCC byte should be when it is read from the tape. Output $\overline{Q}$ of flip-flop 1 is AND'ed at gate 406 with $\overline{420}$. The output of gate 406 represents the parity of the LCC. This results from the fact that if 420 is low, the inputs to gate 406 can be high only when in the 200 or 556cpi tape mode. The outputs of AND gates 401 and 406 are then OR'ed at gate 402 which in turn is used as an input to NAND gate 403. The other input to NAND gate 403 is the output of the LCC/CCC window 440, more of which will be explained later. The output of gate 403 is then OR'ed at gate 404 with signals 421 and 232 to form signal 423 which predicts the parity of the CCC. Also used as inputs to gate 404. Signal 421 forces even parity whenever a seven track tape with binary coded decimal bytes is read, signal 232 forces parity signal 423 to indicate even parity whenever an all zero byte is present in the output buffer of the skew correction registers.

Referring now to FIG. 3 signal 231 and signal 234 are AND'ed at gate 300 to form signal 315. Signal 315 clocks binary counter 411 of FIG. 4 whenever an all zero data byte is transferred into CRI. It is also used as the J input to flip-flop 301. The Q output of flip-flop 301 is AND'ed with signal 311 at AND gate 302, whose output is in turn used as the K input to flip-flop 301 and the J input to flip-flop 303. Signal 311 is generated by flip-flops 305 and 306 of FIG. 3. The J input to flip-flop 305 is signal 313, which, when at high level indicates that CRI is empty and the skew correction output buffer is full. A high level at 313 is also a condition precedent to the generation of transfer clock 234. The initial condition of output Q of flip-flop 306 is high and output Q of flip-flop 305 is low; all flip-flops having been reset between data blocks by master reset signal 310. Output Q of flip-flop 305 and output Q, 311 of flip-flop 306 are then AND'ed at AND gate 307, whose output is then used as an input to the K input of flip-flop 305 and the J input of flip-flop 306. When the first 230 pulse is generated with signal 313 high, the Q output of 305 goes from a low to a high state indicating that the data has been transferred from the skew correction output buffer to CRI. The J input to 306 was low because the output of AND gate 307 was low and signal 236, which indicates that CRII of FIG. 1 has been read by the logic network and now may be cleared, is also low because during initialization all registers were cleared, both the J and K inputs to 306 are low when the first 230 pulse is generated and the output states of the flip-flop will remain the same. After the data has been read into CRI, the inputs to flip-flops 305 and 306 will be as follows: Signal 313 would be low since now CRI is no longer empty, input K to flip-flop 305 would be high and at flip-flop 306 the J input would be high whereas the K input would still be low. At the next 230 pulse output Q of flip-flop 305 would toggle to a low state, output Q of 306 would toggle to a high state and the Q output of 306 would go from a high to a low. This chain of events would cause the output of AND gate 302 to go low, thereby changing the J and K inputs to flip-flops 303 and 301, respectively. At this time Q output 312 of flip-flop 303 would be low indicating that although there is data in CRII, that data is not all zeroes.

As has been described, data is read in and its position, in the output buffer of the skew correction registers, CRI, or CRII is noted. At the same time parity of the accumulated data is noted and maintained. At the end of the data block a CCC byte should appear four character times or 4.0/1.45 blank times later, as blank time being equivalent to 1.45 data intervals. Signal 435 will load the binary number set by signals 430 through 433 into binary counter 411. Signals 430 through 433 may be either hardwired for fixed window application or may be varied by either firmware or software for sliding window approach for looking for the CCC byte. The sliding affect is achieved each time the record is reread by loading a different number into binary counter 411. In this manner, i.e., by loading in binary count 1110, the window is opened for the third, fourth and fifth blank times. This is made possible as follows: the first 315 pulse causes the binary counter 411 to count to 1111, the binary to BCD converter 412 of FIG. 4 does not recognize binary count 1111 and therefore will not respond to the count. The next 315 pulse will clock in 0000, the next clock 0001, etc. In this way, we open our window which is in effect decimal counts 1, 2, and 3 by the third through fifth 315 pulses. In a like manner, by loading in binary count 1110, the window would be four blank counts or decimal codes zero through three, while only during counts 1, 2, and 3 would be looking for the CCC. Assuming that binary count 0000 was loaded into the counters as would normally be the case on the first pass, the first 315 pulse thereafter would cause the binary counter to recycle to the binary one state at the same time causing the binary to decimal converter 412 to high a high level signal level output one. Since the standard tape specification requires at least one blank time between the end of the data block and the CCC to distinguish data from check characters, no data should be read during this time, and consequently, the high level signal at output zero has no effect on the detector. If at the second transfer clock, no data has been read, then the input 232 to gates 404 and 414 would remain low disabling AND gate 414 and forcing the output of AND gate 404 high. Signal 232, 231 is an input to NAND gate 300 of FIG. 3 and is AND'ed with the transfer clock 234 to produce signal 315 which represents that a blank has been injected into the output buffer of the deskew registers and that that data is now ready for transfer to CRI. So long as AND gate 414 is disabled and the BCD to decimal converter has not yet reached count three AND gate 407 is disabled. Should data be read into the deskew registers causing signal 232 to go high an enabling AND gate 414 to respond to the converter 412 outputs or if no data is read prior to BCD to decimal converter 412 reaching count three then, at that time, OR gate 415 will furnish a high level output signal enabling AND gate 407 to pass through the transfer clock signal 234 as the J input to flip-flop 408. When this occurs, the next 230 pulse will clock a 1 into the Q output of flip-flop 408 indicating that the CCC is now in CRI. As soon as the 310 input to AND gate 409 goes high indicating that CRII is now empty and may be read into, the next Y clock will toggle flip-flop 410's $\overline{Q}$ output from a high to a low indicating that the CCC is in CRII. This transition is made possible because the output level change of GATE 409 is also used as a J input to flip-flop 410, however, it is necessary that input 310 to AND gate 409 also be high at the same time. As noted earlier, a high level at 310 indicates that CRII is empty and is now ready to accept another byte of data. Once the CCC has been read out of CRII signal 236 also an input to the K input of flip-flop 410 will go from a low to a high and the next 230 pulse will toggle output signal 422 to a low level state indicating that the CCC is no longer in CRII.

In the event 800cpi, NRZI tape is not being read and no CCC byte is written on the tape, the circuit described above for 800cpi, NRZI tape may be utilized in detecting the LCC. When used in this manner, signal 420, which is a high when 800cpi NRZI tape is being read is interpreted such that whenever it is low, the appropriate signals are generated such that the various logic circuits generally reflecting the presence or absence of a CCC are interpreted as the presence or absence of an LCC. In this manner a sliding window is provided for observation of the LCC.

While the principles of the invention have now been made clear in an illustrative embodiment, there will be many modifications of the structure, arrangement portions, elements, materials, and components that are obvious to those skilled in the art without departing from those principles. The appended claims are therefore intended to cover and embrace any such modifications within the limits of the true spirit and scope of the invention.

What is claimed is:

1. A variable cyclic redundancy character detector for use in a magnetic tape unit used in a data processing system comprising:
   a. discrimination means for determining whether data or a blank was read from the magnetic tape and what type coding was used in writing the data on the magnetic tape;
   b. data shifting means connected to the discrimination means for aligning and shifting the data read from the magnetic tape, the data shifting means further comprising a plurality of data registers;
   c. logic means connected to the data shifting means for determining if the cyclic redundancy character has been read, where it is in the data shifting means, and whether or not the cyclic redundancy character was a blank;
   d. control signal means connected to the logic means for providing the necessary signals to the logic means to interpret the data being read from the magnetic tape;
   e. counting means connected to the logic means for varying the time frame for looking for the cyclic redundancy character from the magnetic tape;
   f. parity checking means connected to the data shifting means for determining the validity of the data read from the magnetic tape and for generating a signal each time a byte of data is read from the data shifting means.

2. The variable cyclic redundancy character detector of claim 1, wherein the discrimination means further comprises:
   comparison means for determining if a logical one has been written in at least one bit of the data byte, and;
   tape interpretation means for determining the coding standard used in writing data on the magnetic tape.

3. A variable cyclic redundancy character detector as recited in claim 1, wherein the counting means further comprises:
   a loadable, programmable counter;
   decoding means responsive to a selected plurality of the counter's outputs for providing an output signal only if a predetermined number has been counted and a non-blank cyclic redundancy character has not been read prior to the predetermined count.

4. The variable cyclic redundancy character detector of claim 1, wherein the data shifting means further comprises:
   a plurality of data registers selectively responsive to control signals for aligning data; and
   a plurality of intermediate registers for storing the aligned data.

5. The variable cyclic redundancy character detector of claim 1, wherein the parity checking means further comprises:
   an arithmetic unit for performing the appropriate algorithm on the data from the data shifting means to calculate the cyclic redundancy character value;
   parity logic gates for determining the parity of the cyclic redundancy character; and error indication means for indicating when the cyclic redundancy character read from the magnetic tape is not the same as that calculated.

6. A method of reducing unrecoverable read errors from magnetic tape generally associated with data processing system comprising:
   a. reading the data record from the magnetic tape;
   b. aligning each bit of the data byte in parallel;
   c. detecting whether one or more of the bits of the data byte is a logical one;
   d. preparing for the reading of a cyclic redundancy character when step c) above indicates an all zero byte;
   e. inserting a blank cyclic redundancy character if a cyclic redundancy character is not read within a preset number of byte spaces after the last non-zero data byte;
   f. comparing the computed value of the cyclic redundancy character with the cyclic redundancy character actually read;
   g. repeating steps a) through f) on the same data record with a different preset number inserted in step e), if the computed cyclic redundancy character value is not equal to the actual cyclic redundancy character value;
   h. repeating steps a) through g) until the correct cyclic redundancy character is read or it is determined that the data block is invalid; and,
   i. reading the next data record from the magnetic tape.

* * * * *